United States Patent
Oler

[15] 3,658,192
[45] Apr. 25, 1972

[54] AUTOMATIC BALE STOOKER
[72] Inventor: Allen L. Oler, Lethbridge, Alberta, Canada
[73] Assignee: Oler-Stringam Manufacturers Ltd., Lethbridge, Province of Alberta
[22] Filed: Dec. 14, 1970
[21] Appl. No.: 97,807

[52] U.S. Cl. ............................................................214/6 B
[51] Int. Cl. ..............................................................B65g 57/32
[58] Field of Search......................................................214/6 B

[56] References Cited

UNITED STATES PATENTS

| | | | |
|---|---|---|---|
| 3,370,719 | 2/1968 | Oler | 214/6 B |
| 3,375,940 | 4/1968 | Thompson et al. | 214/6 B |
| 3,512,659 | 5/1970 | Vanderkrogt | 214/6 B |

Primary Examiner—Gerald M. Forlenza
Assistant Examiner—Robert J. Spar
Attorney—Kent & Ade

[57] ABSTRACT

The trip lever of an automatic bale stooker operates a control mechanism which sequences an hydraulic piston and cylinder assembly to move the carriage with the bale down and then back up again and at the same time releasing and setting a bale separator. Means are also provided to transfer some of the bale weight to the frame when delivering to the furthermost two track ways under which circumstances the actuating arm is extended almost horizontally and the greatest leverage is encountered.

15 Claims, 19 Drawing Figures

INVENTOR
ALLEN L OLER
BY *Kent & Ade*
ATTORNEY

INVENTOR
ALLEN L. OLER
BY
ATTORNEY

Patented April 25, 1972

INVENTOR

ALLEN L. OLER.

BY

ATTORNEY

Patented April 25, 1972 3,658,192

INVENTOR.
BY ALLEN L. OLER

AUTOMATIC BALE STOOKER

This invention relates to new and useful improvements to automatic bale stookers of the type illustrated and described in my corresponding U.S. Pat. No. 3,370,719 dated Feb. 27, 1968.

This patent illustrates an automatic bale stooker in which the bales are pushed upwardly along a ramp by the baling machine and are received in a bale receiving station. A lever is tripped by the bale in the station which deposits the bale onto a carriage and mechanism is shown to direct the carriage down one of a plurality of diverging track-ways so that the bale is deposited onto a bale receiving platform. Control mechanism is provided to stack these bales sequentially until a triangular pile of 15 bales is formed, said pile then being automatically deposited upon the ground in stacked array.

The present invention shows improvements over the device described in the above patent, the principal improvements being conversion to hydraulic piston and cylinder actuation together with a novel control mechanism actuated by the tripping device in the bale receiving station and actuated by the bale in the station.

A further improvement is the provision of means to transfer the weight of the bale when in the carriage, to the supporting framework particularly when the carriage is delivering a bale down the tracks farthest from one end of the assembly under which circumstances the actuating arms controlling the carriage are almost horizontal. Under these circumstances the leverage effect is considerable and it is desirable to transfer some of this weight under these circumstances.

Another improvement of the present device is the provision of a novel hydraulic valve assembly which automatically counteracts an extremely heavy bale which may be encountered and prevents same from causing the carriage to rush down the track-way. By the same token the return speed is not reduced under these circumstances.

A further improvement is the provision of a bale separator which automatically forces the bale downwardly from the bale receiving station to the bale distribution member or carriage and forcibly separates it from the next succeeding bale. It should be understood that the bales being pushed by the succeeding bales tend to intermesh by the ends thereof and hangups can occur at the transfer from the bale receiving station to the carriage.

The present device not only shows improvements over the previous patent but also is economical in construction, and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying FIGS. in which.

In the drawings like characters of reference indicated corresponding parts in the different figures.

Figure 1:
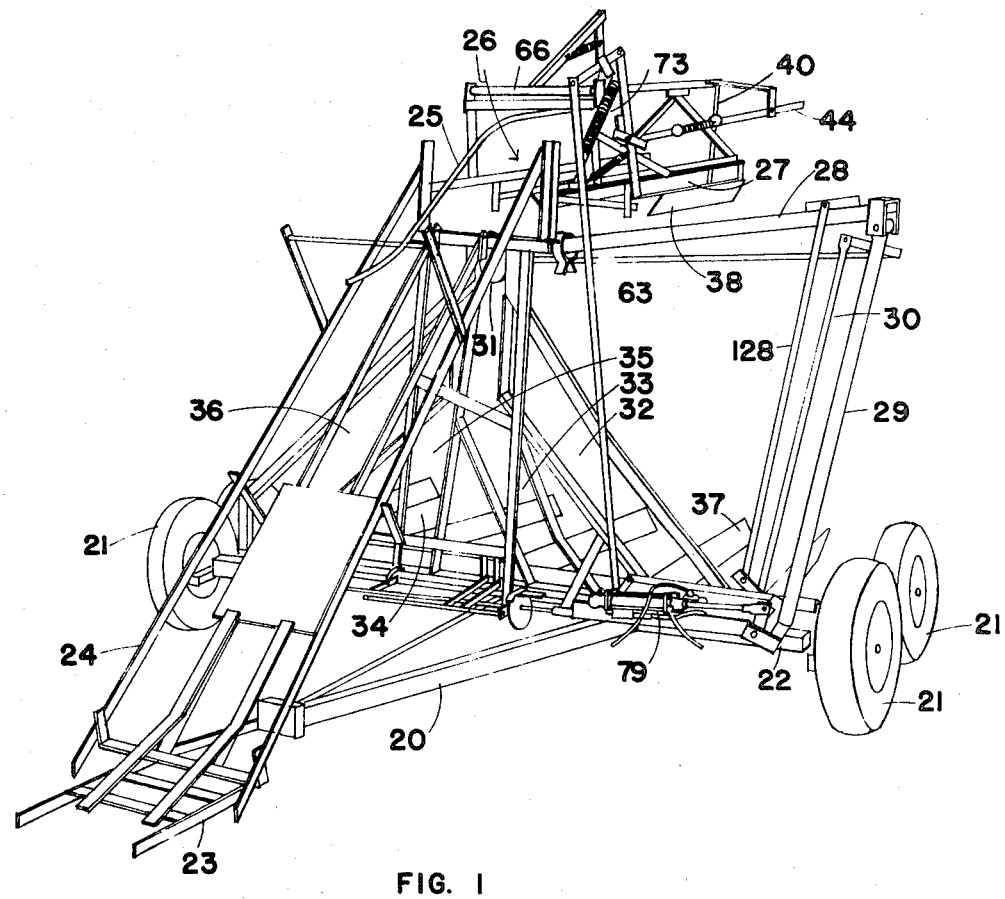
FIG. 1 is an isometric view of the automatic bale stooker.

Proceeding therefore to describe the invention in detail, reference should first be made to FIG. 1 which shows the general layout of the machine including supporting framework 20 having double ground engaging wheels 21 journalled for rotation upon each end of transverse member 22.

The end 23 connects to a baling machine (not illustrated) and bales are ejected from this machine into the upwardly and rearwardly extending chute or static conveyor 24.

Figure 2:
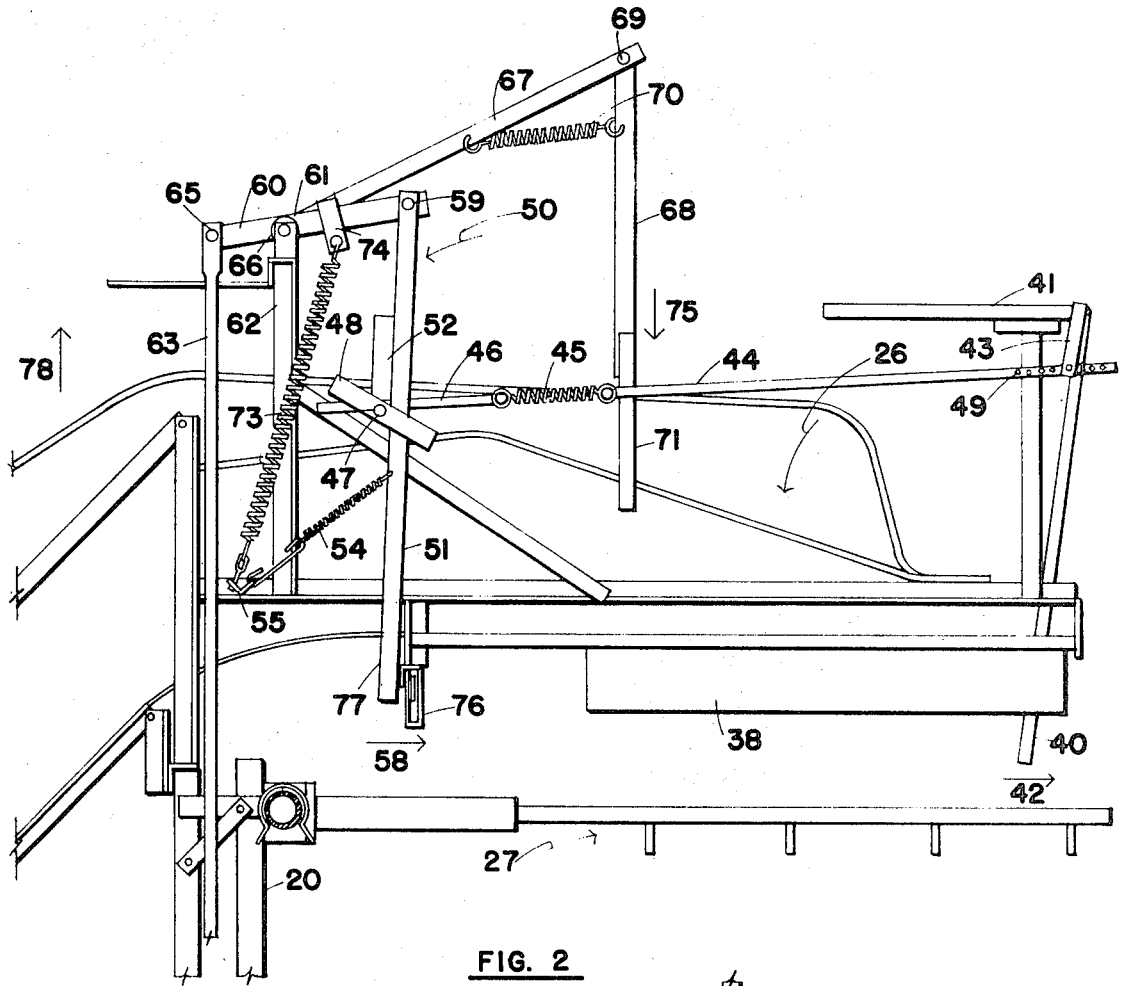
FIG. 2 is an enlarged fragmentary side elevation of the bale receiving station.
Figure 13:
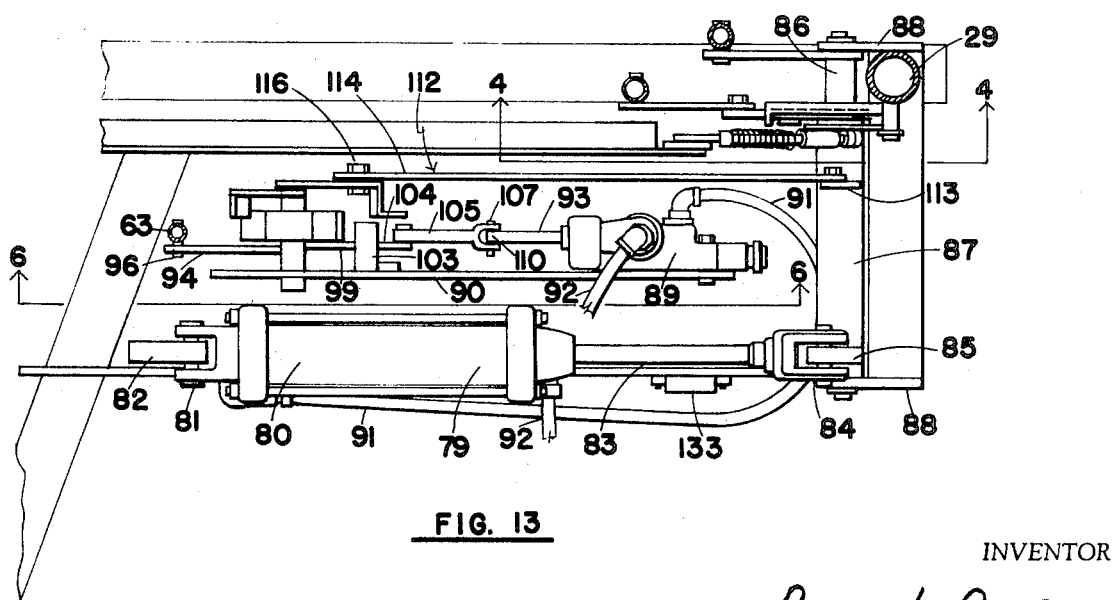
FIG. 13 is a top plan view of the control mechanism together with the piston and cylinder assembly and the weight transfer mechanism.
Figure 8:
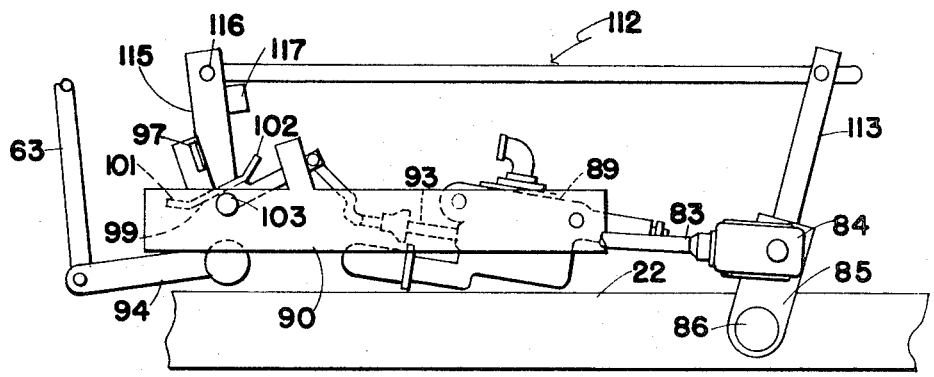
FIG. 8 is an enlarged view similar to FIGS. 6 and 7 but showing more of the mechanism incorporated therein.
Figure 16:
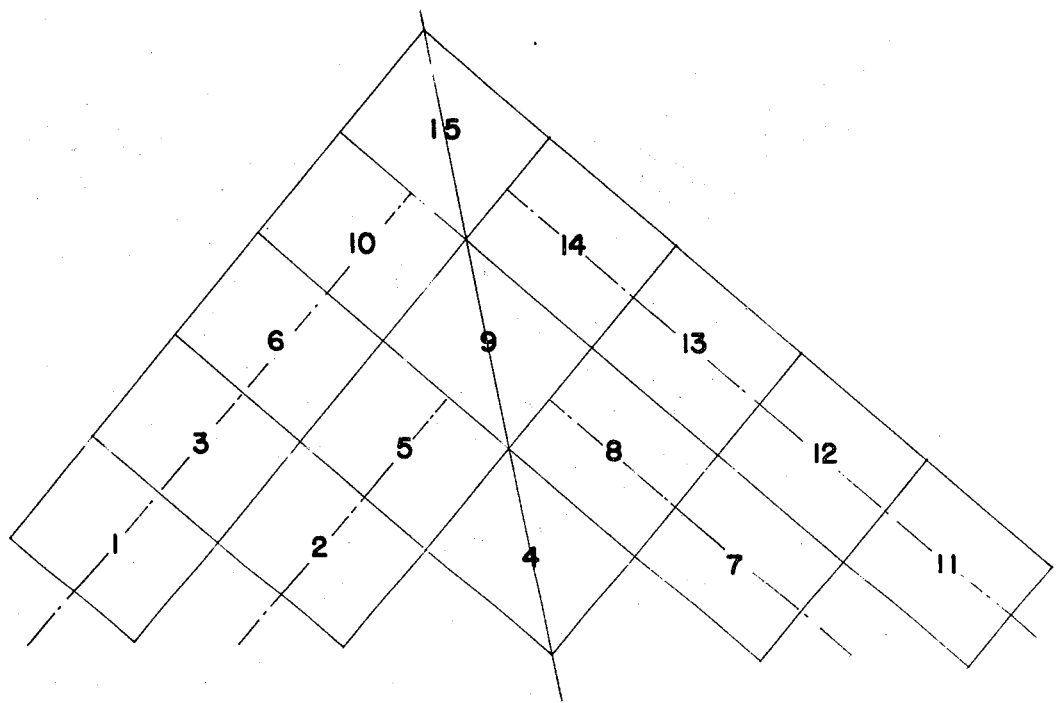
FIG. 16 is a schematic view of a pile of fifteen bales placed by this device.
Figure 19:
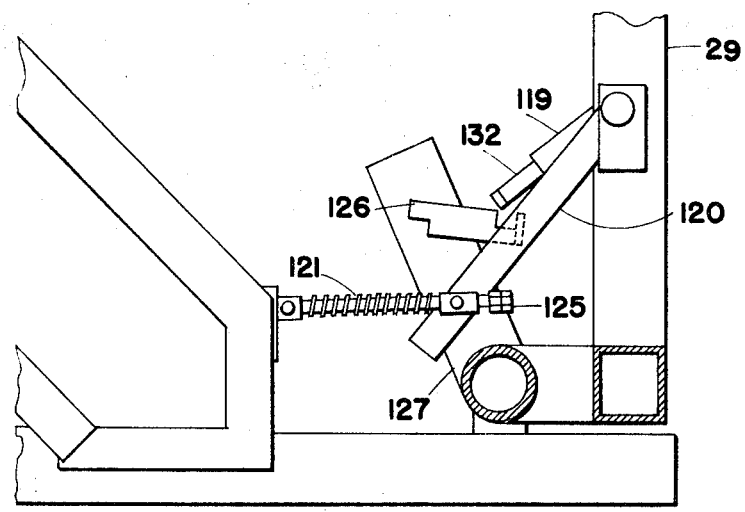

The bales are pushed upwardly by the succeeding bales and the leading bale strikes the curved rail 25 adjacent the upper end thereof which tilts the bale through 45° until it takes up the position shown in FIG. 13. It is then resting within the bale receiving station collectively designated 26 ready for transfer to the bale dispatching member or carriage 27 (see FIG. 2) normally situated immediately below the bale receiving station 26. This carriage is supported upon a main arm 28 and is moved by a main actuating arm 29 and is supported by secondary actuating arm 128. A wheel 31 is secured to the end of the carriage and guides the carriage through any one of a plurality of trackways 32,33,34 35 or 36 selected by conventional mechanism (not illustrated). Suffice to say that the bales are stacked sequentially as shown in FIG. 16 upon the plurality of spaced and parallel bale receiving members 37 extending rearwardly from the main supporting framework, with bale No. 1 being situated between the members on the right hand side of the device as viewed in FIG. 1. When the full stack of bales is completed, the members 37 are moved or pivoted downwardly and the pile of bales is withdrawn from the machine and remains in the field.

For clarification purposes, the bales are stacked from one to 15 by the carriage 27 moving successively down various tracks or track-ways as follows:

| | |
|---|---|
| Bale 1 down track 32. | Bale 2 down track 33. |
| Bale 3 down track 32. | Bale 4 down track 34. |
| Bale 5 down track 34. | Bale 6 down track 32. |
| Bale 7 down track 36. | Bale 8 down track 36. |
| Bale 9 down track 34. | Bale 10 down track 32. |
| Bale 11 down track 35. | Bale 12 down track 35. |
| Bale 13 down track 35. | Bale 14 down track 35. |
| Bale 15 down track 34. | |

Figure 3:
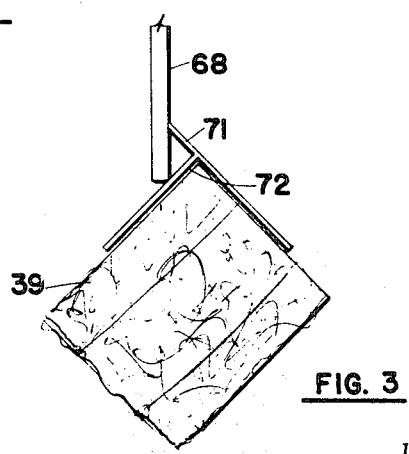
FIG. 3 is an enlarged fragmentary front elevation of the bale separator shown engaging the corner of a bale.

The bale receiving station includes a pair of pivoting side panels 38 within which a bale 39 in the position shown in FIG. 3, rests until released for transfer to the bale dispatching member or carriage 27. However as this mechanism is conventional, it is not believed necessary to describe same further.

However the releasing action is initiated by the front end of the bale within the bale receiving station striking a trip lever 40 pivoted by the upper end thereof transversely upon a support 41 at the front end of the bale receiving station. The trip lever is moved in the direction of arrow 42, is connected to a relatively short lever 43 at the upper end thereof which in turn is connected to a link or lever 44 extending forwardly from the lower end of the lever 43.

A shock absorbing spring 45 secures the end of the link 44 to a secondary link 46 which rests for sliding motion upon a pin 47 extending inwardly from support member 48. The link 44 is provided with a plurality of drillings 49 for adjustable relationship with the lower end of the lever 43.

A trigger assembly collectively designated 50 includes a substantially vertical trigger rod 51 (see FIG. 14) and a trigger member 52 welded to one side thereof with the lower edge 53 of the trigger plate 52 normally resting on pin 47 and held there by means of relatively light tension spring 54 extending between the member 51 and an anchoring point 55 on the supporting framework. However movement of the trip lever 40 in the direction of 42 by the end of the bale striking same, will move links 44 and 46 also in the direction of arrow 42 and cause a detent 56 on link 46 to engage the trigger plate 52 and to pivot the member 51 in the direction of arrow 58 thus disengaging same from the pin 47.

The upper end of member 51 is pivotally secured by pin 59 to a cross head lever 60 which in turn is pivotally secured intermediate the ends thereof upon a pivot 61 at the upper end of a vertical support member 62.

An actuating rod 63 forming part of control mechanism collectively designated 64, is pivotally secured by the upper end thereof to the upper end of cross head lever 60 by means of pivot 65.

Pivot or shaft 61 extends across the bale receiving station and a tubular member 66 is bearably supported upon this shaft and is secured to cross head lever 60. Also secured to this tube is an upwardly and rearwardly inclining member 67 having a bale separator 68 depending therefrom and pivotally secured at the upper end thereof to the member 67 by means of pivot 69. A spring 70 normally maintains member 68 substantially vertical. A right angled bale corner engaging portion 71 is secured to the lower end of member 68 and is shown in FIG. 3. This right angled member 71 engages the corner 72 of the bale 39 which has been rotated to this position as it enters the bale receiving station, by means of curved rail 25 as hereinbefore described.

A relatively heavy duty compression spring 73 is also secured to anchor point 55 by the lower end thereof and extends upwardly to a sliding clamp clip 74 surrounding the rear portion of cross head lever 60. This clamp clip is slidable within limits to adjust the tension of springs 73.

When the trigger assembly is released by links 44 and 46 as hereinbefore described, tension spring 73 pulls down upon the rear end of cross head lever 60 rotating it around its pivot 61 and also moving the bale separator downwardly in direction of arrow 75. As the bale within the bale receiving stations strikes the trip lever 40, thus releasing the trigger and actuating the bale separator, release mechanism 76 is struck by the lower end 77 of member 51 thus releasing the side panels 38 and allowing the bale to be pushed downwardly by the bale separator into the bale dispatching member or carriage 27.

As this operation occurs, the actuating rod 63 moves upwardly in the direction of arrow 78 and operates the control mechanism 64 as will hereinafter be described.

Figure 14:
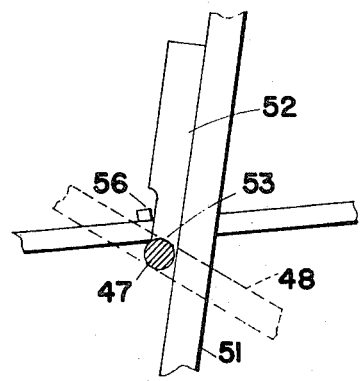
FIG. 14 is an enlarged fragmentary side elevation of the trigger mechanism per se.

When the control mechanism sequence has been completed, the actuating rod 63 is moved downwardly as will hereinafter be described, thus rocking the cross head 60 and raising the trigger assembly upwardly against tension of spring 73 which is extended. As soon as the lower end 53 of the trigger plate clears pin 47, return spring 54 pulls the trigger assembly to the locked position as shown in FIG. 14 thus setting the mechanism ready for the next bale to enter the bale receiving station. At the same time the side panels 38 are closed ready to receive the next bale and repeat the sequence.

As mentioned previously, upward movement of the actuating rod 63 operates the control mechanism collectively designated 64 which is situated adjacent supporting framework member 22 just behind an hydraulic piston and cylinder assembly 79 also mounted on the framework at this point.

The piston and cylinder assembly 79 includes a cylinder 80 and is secured by the front end thereof upon a pivot pin 81 to the frame member 82. The piston rod 83 extends rearwardly of the cylinder and is provided with a clevis end 84 secured to the upper end of a lever 85 journalled upon a main shaft 86 supported within bearing tube 87 and this shaft 86 is operatively connected to the actuating member 29 moving the bale dispatching member or carriage as hereinbefore described, links 88 extending between the ends of shaft 86 and this member 29.

A shuttle valve 89 is secured to a support plate 90 and is operatively connected to a source of hydraulic power (not illustrated) present on the towing vehicle such as a tractor and supplying hydraulic fluid under pressure to this shuttle valve. Operation of the shuttle valve routes this fluid via conduits 91 and 92 to the front end or rear end of the cylinder 80 respectively thus causing the ram to move the piston rod 83 inwardly or retract same or outwardly to extend same. The shuttle valve actuating rod 93 is adjusted so that when it is fully moved into the valve 89, the shuttle valve retracts the cylinder. When it is moved approximately halfway outwardly from the shuttle valve, the valve is neutral and when it is fully moved out from the shuttle valve, to the fullest extent, the ram extends the rod all of which will hereinafter be described.

Figure 10:
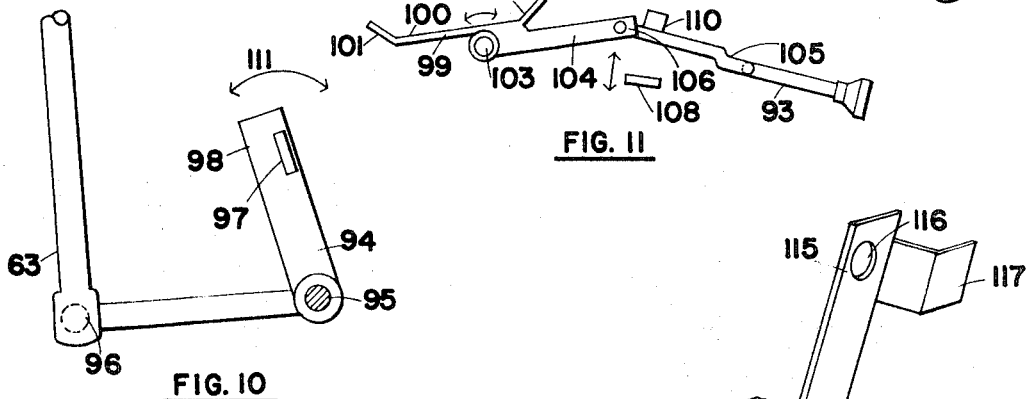
FIG. 10 is an enlarged fragmentary front elevation of the lower end of the actuating rod and bell crank assembly.

The shuttle valve 89 forms part of the control mechanism which also includes a crank arm (FIG. 10) 94 pivoted upon a shaft 95 mounted upon the support plate 90. One end of this crank arm is pivotally secured to the lower end of actuating rod 63 by means of pivot pin 96 and an offstanding portion 97 extends from adjacent the upper end of the other arm 98 of this crank arm.

A rock component 99 includes a horizontal portion 100, a rear diagonal portion 101 and a front diagonal portion 102 and this rock component is journalled upon a pivot 103 adjacent the front portion 102, to the support plate 90. A lever 104 extends from the rock component forwardly and is pivotally connected to a further lever or link 105 by pivot 106 and the other end of link 105 is pivotally connected to the shuttle valve rod 93 by means of clevis 107. The portion 104 and link 105 form an overcenter action the position of which is limited at the lower end by means of a stop 108 and at the upper end by a stop 109 and a small lug 110 extends upwardly from adjacent the junction between portion 104 and link 105 as will hereinafter be described.

The offstanding lug 97 of the bell crank arm 94 is situated behind the rock component and as the bell crank is moved by the actuating rod, in an arc indicated by the double headed arrow 111, it strikes the ends 101 and 102 thus rocking the rock component as will hereinafter be described.

Figure 9:
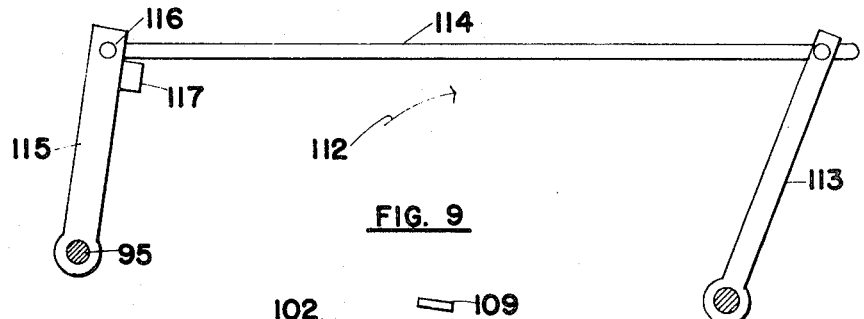
FIG. 9 is a fragmentary side elevation of the linkage between the piston and cylinder assembly and the control mechanism.
Figure 11:
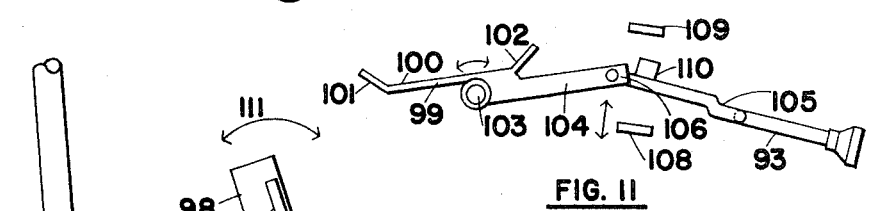
FIG. 11 is a fragmentary enlarged side elevation of the rock component and the over center linkage to the shuttle valve.
Figure 12:
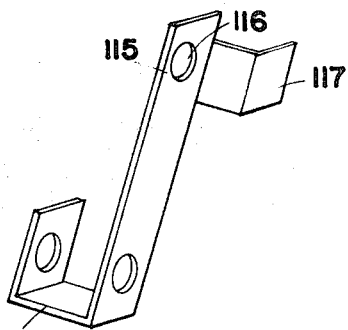
FIG. 12 is an isometric view of the secondary lever of the linkage shown in FIG. 9.

A parallel linkage system (see FIG. 9) collectively designated 112 consists of a primary lever 113 secured to the main shaft 86 and operated thereby. A horizontal link 114 is pivotally secured to the upper end of primary lever 113 and extends to be pivotally connected to the upper end of a secondary lever 115 by means of pivot pin 116. This secondary lever 115 is journalled for rotation by the lower end thereof upon the cross shaft 95 hereinbefore described and an offstanding lug 117 is formed on the forward edge of the secondary link or lever 115 adjacent the upper end thereof and shown in detail in FIG. 12. This secondary link 115 is provided with a U-shaped base 118 both legs of which are journalled upon shaft 95 for purposes of strength.

Figure 6:
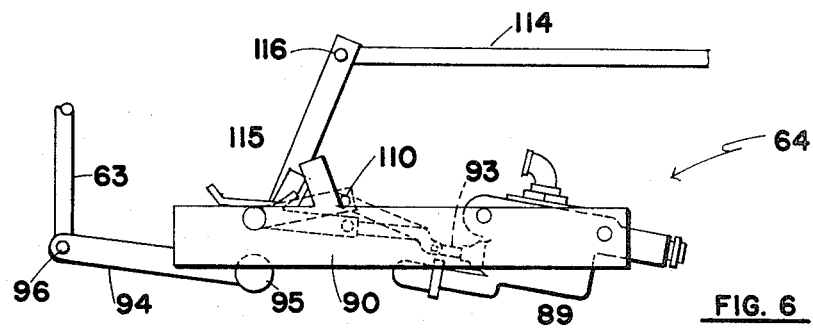
FIG. 6 is an enlarged fragmentary view substantially along the line 6—6 of FIG. 13 and showing the actuating rod in the uppermost or set position.

In operation, the system is normally situated with the carriage at the uppermost position immediately below the bale receiving station. Under these circumstances the trigger assembly 50 is in the "up" position shown in FIG. 2 with the tension spring 73 extended and the bale separator in the uppermost position. Under these circumstances the actuating rod 63 is in the lower position shown with the piston rod 83 extended as shown in FIG. 13. Under these circumstances the parallel linkage 112 inclines forwardly as shown in FIG. 6.

The shuttle valve is in the half way position so that the system is in neutral.

When a bale strikes the trip lever as hereinbefore described, the actuating rod is moved upwardly by the action of the tension spring 73. This rotates the bell crank 94 so that the arm 98 thereof moves rightwardly with respect to FIG. 10. The lug 97 strikes the forward portion 102 of the rock component 99 thus rotating the rock component upon its shaft 103 so that it takes up the position shown in FIG. 6. Rotation of the rock component 99 causes the overcenter linkage 104 and 106 to move downwardly thus withdrawing the shuttle valve shaft 93 from the shuttle vale 89 and causing hydraulic fluid under pressure to be routed to the front end of cylinder 79. This causes the ram to retract thus withdrawing the piston rod and actuating main shaft 86 which in turn operates the carriage to deposit the bale therein to the required location upon members 37. As the piston shaft 83 is withdrawn, the parallel linkage 114 moves to the left with respect to FIG. 9 causing the offstanding lug 117 on secondary lever 115 to strike the front edge of the arm 98 of the bell crank 94 thus moving it rearwardly or to the left with respect to FIG. 10 and at the same time lowering the actuating rod to the lowermost position. The lowering of this rod 63 rotates the cross head lever 60 and resets the trigger assembly as hereinbefore described with the tension spring extended ready for the next bale, it being understood that the bale separating component is also raised to the bale disengaged position by this action.

Figure 7:
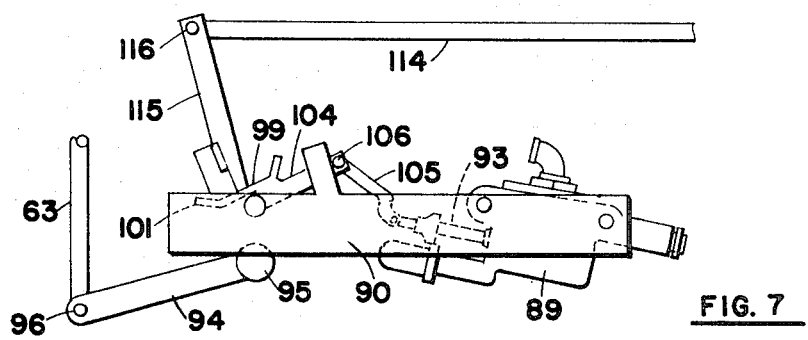
FIG. 7 is a view similar to FIG. 6 but showing the actuating rod in the lowermost or actuating position.

Movement of the arm 98 of bell crank to the left causes the offstanding lug 97 thereon to strike the rear end 101 of the rock component thus rotating it about shaft 103 to the position shown in FIG. 7. The overcenter action of the link 104 105 withdraw the shuttle valve fully out which reverses the flow of the fluid and causes same to flow to the rear of cylinder 80 and thus causes the ram and piston rod 83 to reverse its motion and to extend. This returns the carriage to the uppermost position due to the main actuating arm 29 and also moves the parallel linkage 114 to the right with respect to FIG. 9. Offstanding lug 117 then strikes small lug 110 on the overcenter linkage and moves the shuttle to the half way position thus placing the shuttle valve in the neutral position and cutting off the flow of oil from the cylinder 80 until the next sequence is triggered by the trip lever being struck by the next succeeding bale entering the bale receiving station.

In FIG. 6, the overcenter linkage component 104 and 105 are shown in phantom, two positions being indicated. The uppermost position in phantom is the position in which the linkage is when the shuttle valve is in the piston extending position and when lug 110 is struck by lug 97, the overcenter linkage is moved downwardly to the second position so that the shuttle valve rod moves half way inwardly into the neutral position.

Reference to FIG. 1 will show that when the carriage is delivering bales to the end members 37 via track ways 35 and 36, the main and secondary actuating arms 29 and 30 will be extended to the left inasmuch as they pivot from the lower end thereof. The leverage of the weight of the bale together with the carriage under the circumstances, causes the carriage to rush down these track ways and land with a fairly heavy jar on the lower end thereof. Furthermore, there is considerable strain upon the arms due to the centilever effect of these arms being almost horizontal.

Figure 4:
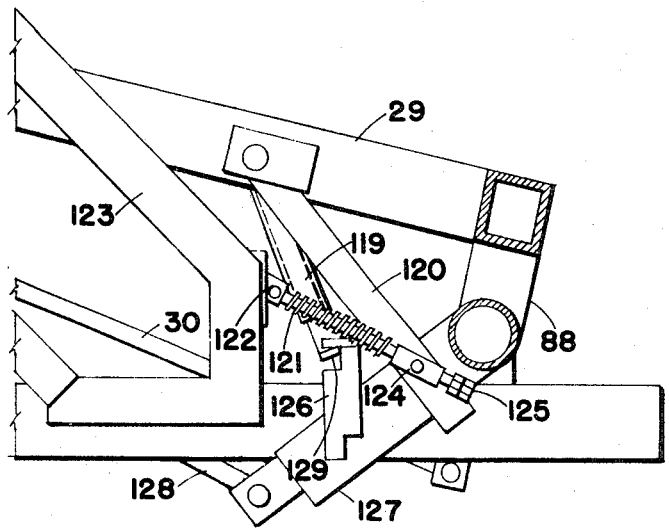
FIG. 4 is an enlarged fragmentary view of the weight transfer device shown in the engaged position and being a section substantially along the line 4—4 of FIG. 13.
Figure 5:
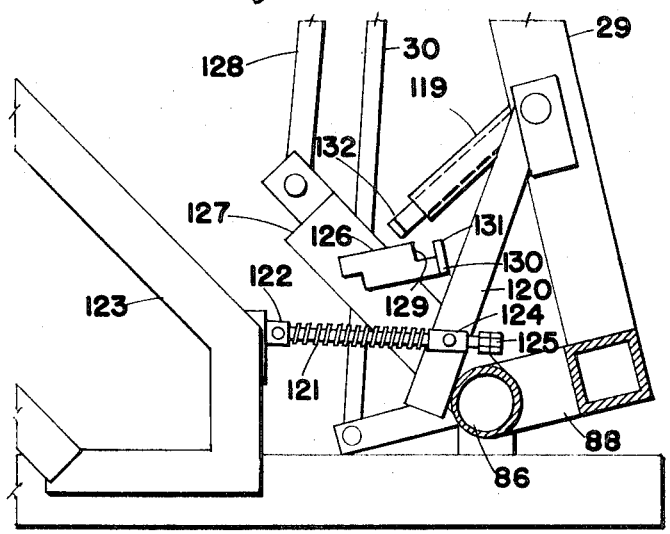
FIG. 5 is a view similar to FIG. 4 but showing the weight transfer device disengaged.

There is provided means for relieving the speed of travel when trackways 35 and 36 are being utilized and in this connection, reference should be made to FIGS. 4 and 5.

Telescopic bar 119 is pivotally connected by one end thereof to a link 120 upon the main actuating arm 29 adjacent the lower end thereof. An adjustable spring loaded rod 121 is pivotally connected by means of pin 122, to supporting structure 123 and slides within a sheave 124 by which means it is pivotally connected to adjacent the distal end of the link 120, nut 125 forming adjustment for the clearance between dog 119 at point 132 between plate 126 when in the position shown in FIG. 5, and shown schematically in FIGS. 17 and 18.

A two position stop member or plate 126 is secured to link plate 127 which in turn is secured to a further actuating rod 128 and this stop member is provided with a first top position 129 and a second stop position 130. A second link 127A extends between rod 128 and plate 127 and is pivotally connected thereto by pin 128A.

Figure 17:
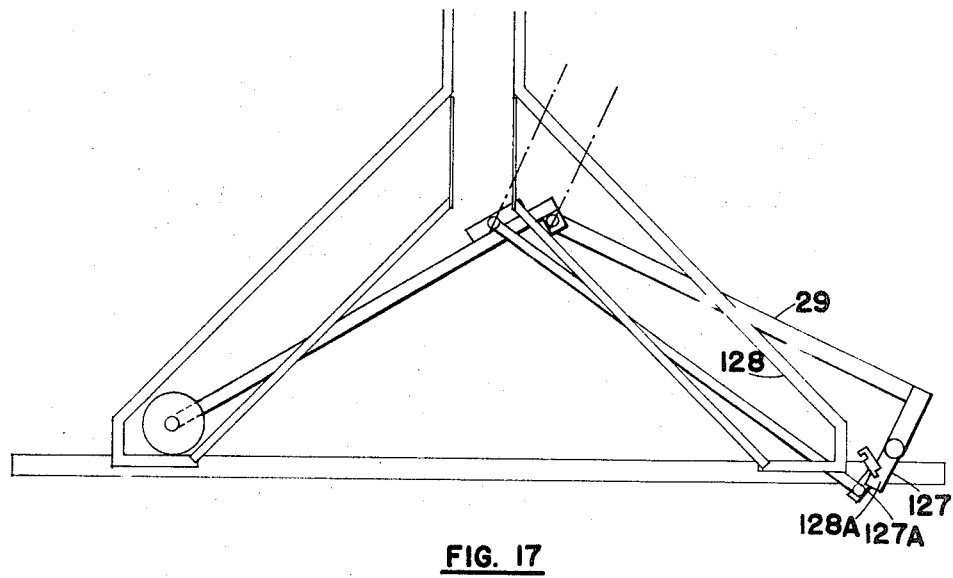
FIG. 17 is a schematic view of the linkage with the carriage in the outermost lower position.
Figure 18:
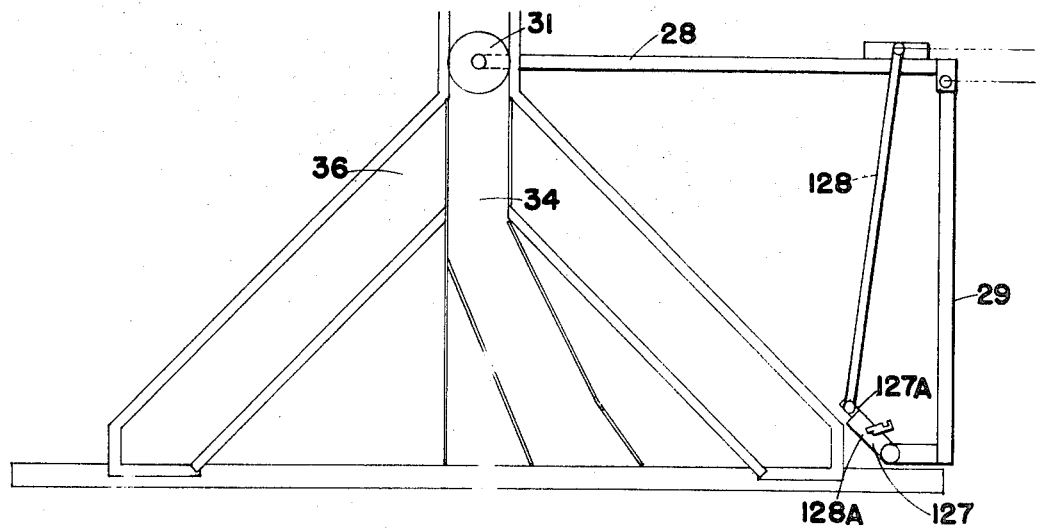
FIG. 18 is a schematic view showing the linkage with carriage at the uppermost position.

When the carriage wheel leaves the upper position at the top of trackway 34, to deliver bales 11, 12, 13 and 14, the weight is carried with the secondary arm 128 lever 127A and 127 until it reaches point 1 in trackway 36 as shown in FIG. 18. Then the telescoping dog 119 takes over at this point to prevent the carriage from speeding downward and stopping at the bottom with an impact. The speeding is caused through the leverage and action of arms 28, 29 and 128 at hinge point 1 and 2. You will note in FIG. 18, two lines have been drawn one at point 1 and the other at point 2 parallel with each other, and at 90° angle with the arm 29. The distance between these two points is about 4 inches, when arm 29 is standing vertical as shown in FIG. 18. With reference to FIG. 17, it will be seen that points 1 and 2 are about 9 inches apart, when carriage is at the lower position in trackway 36.

This leverage action leads about 5 inches more to the stroke to lever 127A and 127, in other words, to the stroke of the hydraulic cylinder, thus speeding up the travel of the carriage in tracksways of 36 and 35 only. In trackway 36 the speeding action is about the last 3 feet down and in trackway 35 about the last 20 inches down.

It will also be seen in FIG. 17 that the action of lever 127A and 127 that lever 127A and arm 128 does not carry the load when telescoping dog takes over.

The angular relationship between link 120 and the telescopic arm 119 is such that the position of the main actuating arm 29 and the other actuating arm 128 decides whether or not the telescopic arm engages one or other of the stop positions 129 and 130. When the end of the telescopic arm does engage one of these stop positions, the weight of the bale carriage is transferred through the actuating arm 128 and upwardly through the telescopic arm 119 to the main actuating arm 29 adjacent the lower end thereof due to the compression of the telescopic arm 119.

FIG. 4 shows the end of the telescopic arm 119 engaging the first stop position 129 so that the weight is transferred upwardly or additional support is provided to the main arm 29.

The position of the arms 29 and 129 is decided by the trackway down which the carriage is moving.

When the carriage is moving down tracks 32, 33 and 34, the linkage keeps the telescopic arm 119 out of contact with the stop plate 126. When number 7 bale is being delivered, trackway 35 is being used and the end of the telescopic arm 119 engages the second stop position 130.

This is also true when number 8 is being delivered which also utilizes trackway 35.

When bales 11, 12, 13 and 14 are being delivered, track way 36 is being used under which circumstances the end of the telescopic bar 119 engages the first stop position 129.

During this sequence it is desirable that the end of the telescopic bar 119 be prevented from engaging the second stop position 130 and in this connection a detent 131 is provided on the end of the stop plate 12 which is engageable by an offstanding lug 132 on the end of the telescopic bar 119. This pulls the telescopic bar outwardly rather than let it override the end of the stop plate so that when the carriage starts descending trackway 35, the end can move to engage the first stop position 129 thus transferring the weight to the main arm adjacent the base thereof.

Figure 15:
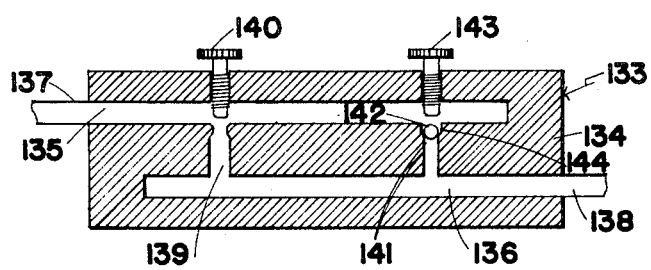
FIG. 15 is a schematic view of the hydraulic control valve per se.

As mentioned previously, relatively heavy bales, particularly when moving down the trackways 35 or 36, the carriage tends to rush down these trackways and hit the lower end thereof with considerable force. In this connection I have supplied a hydraulic control valve 133 in circuit between the shuttle valve 89 and the cylinder 80, said hydraulic control valve being shown schematically in section in FIG. 15.

It consists of a body 134 having a pair of spaced and parallel horizontal drillings 135 and 136 formed therein. Drilling 135 is provided with a port 137 in one wall thereof and terminates short of the other wall.

Drilling 136 is provided with a port 138 in one wall thereof and also terminates short of the other wall thereof.

A vertical drilling 139 extends between drilling 135 and 136 and an adjustable screw 140 extends through drilling 135 and into the end of drilling 139 and acts as an adjustment for oil passing through this drilling 139.

A further drilling 141 also extends between drillings 135 and 136 spaced and parallel from drilling 139 and a ball valve 142 is provided within the upper end of this drilling. A screwthreadable adjuster 143 also extends through the body and through drilling 135 and engages ball 142 and acts as an adjustment for this ball which in turn sits within a seating 144 formed within drilling 141.

When the carriage is moving downwardly, oil is routed to port 137 and out of port 138 so that the screw 140 becomes an adjustment for the amount of oil passing down drilling 139 and thence to port 138, it being understood that the ball valve 142 is closed off when oil is moving in this direction.

However when oil is moving in the opposite direction, namely when the carriage is moving upwardly, oil passes into port 138 and upwardly through both drillings 141 and 139 and thence out of port 137 so that this oil flow is unrestricted and does not slow down the return action of the carriage whereas adjustment of screw 140 can slow the downward movement of the carriage to any degree desired.

This is in contrast to the operation of a standard restricting valve which of course is two way in its action.

Various modifications can be made within the scope of the inventive concept which is herein disclosed and/or claimed.

What I claim as my invention is:

1. In an automatic bale stooking device which includes supporting framework, a bale receiving station, a movable bale distributing member normally located adjacent said bale receiving station, means for directing the bale distributing member, upon receipt of a bale, downwardly to a predetermined bale depositing position, said last means including a plurality of diverging tracks; the improvement which consists of means for controlling the operation of said bale distributing member, said last means including further means actuated by the bale in said bale receiving station, an hydraulic piston and cylinder assembly in said framework for moving said bale distributing member up and down any one of the plurality of tracks, and a control mechanism operatively connected between said piston and cylinder assembly and said means actuated by the bale in said bale receiving station.

2. The device according to claim 1 in which said means actuated by the bale in said bale receiving station includes a trip lever suspended at one end of said bale receiving station in the path of the bale entered therein, said trip lever being pivoted by the upper end thereof, linkage extending from said trip lever, a bale separator mounted above said bale receiving station, means normally holding said separator in the bale disengaging position against spring pressure, said last means including a trigger assembly, said linkage being connected to said trigger assembly, operation of said trip lever disengaging said trigger assembly, whereby said spring pressure lowers said bale separator onto said bale in said bale receiving station.

3. The device according to claim 2 which includes means to adjust said spring pressure.

4. The device according to claim 1 which includes a control mechanism actuating rod movable from an upper position to a lower position, the upper end of said control rod being operatively connected to said means actuated by said bale, a bell crank pivotally connected by one end thereof to the lower end of said actuating rod, said control mechanism including a shuttle valve operatively connected to said piston and cylinder assembly, a rock component journalled for rocking action in said framework, over center linkage extending between one side of said rock component and said shuttle valve, means on the other end of said bell crank engaging with one end of said rock component when said actuating rod is in the upper position, and means operated by said piston and cylinder assembly engageable with said other end of said bell crank to move said actuating rod to the lower position and setting said trigger assembly.

5. The device according to claim 2 which includes a control mechanism actuating rod movable from an upper position to a lower position, the upper end of said control rod being operatively connected to said means actuated by said bale, a bell crank pivotally connected by one end thereof to the lower end of said actuating rod, said control mechanism including a shuttle valve operatively connected to said piston and cylinder assembly, a rock component journalled for rocking action in said framework, over center linkage extending between one side of said rock component and said shuttle valve, means on the other end of said bell crank engaging with one end of said rock component when said actuating rod is in the upper position, and means operated by said piston and cylinder assembly engageable with said other end of said bell crank to move said actuating rod to the lower position and setting said trigger assembly.

6. The device according to claim 3 which includes a control mechanism actuating rod movable from an upper position to a lower position, the upper end of said control rod being operatively connected to said means actuated by said bale, a bell crank pivotally connected by one end thereof to the lower end of said actuating rod, said control mechanism including a shuttle valve operatively connected to said piston and cylinder assembly, a rock component journalled for rocking action in said framework, over center linkage extending between one side of said rock component and said shuttle valve, means on the other end of said bell crank engaging with one end of said rock component when said actuating rod is in the upper position, and means operated by said piston and cylinder assembly engageable with said other end of said bell crank to move said actuating rod to the lower position and setting said trigger assembly.

7. The device according to claim 4 in which said last mentioned means includes parallel linkage operatively connected to said piston and cylinder assembly, said linkage including a secondary lever pivoted by one end thereof to said supporting framework, said secondary lever engaging said other end of said bell crank when said piston and cylinder assembly retracts, the movement of said other end of said bell crank rotating said rock component, operating said shuttle valve and thus reversing the action of said piston and cylinder assembly thereby returning said bale distributing member to adjacent said bale receiving station.

8. The device according to claim 5 in which said last mentioned means includes parallel linkage operatively connected to said piston and cylinder assembly, said linkage including a secondary lever pivoted by one end thereof to said supporting framework, said secondary lever engaging said other end of said bell crank when said piston and cylinder assembly retracts, the movement of said other end of said bell crank rotating said rock component, operating said shuttle valve and thus reversing the action of said piston and cylinder assembly thereby returning said bale distributing member to adjacent said bale receiving station.

9. The device according to claim 6 in which said last mentioned means includes parallel linkage operatively connected to said piston and cylinder assembly, said linkage including a secondary lever pivoted by one end thereof to said supporting framework, said secondary lever engaging said other end of said bell crank when said piston and cylinder assembly retracts, the movement of said other end of said bell crank rotating said rock component, operating said shuttle valve and thus reversing the action of said piston and cylinder assembly thereby returning said bale distributing member to adjacent said bale receiving station.

10. The device according to claim 1 which includes means for transferring some of the weight of the bale in said bale distributing member to said framework when said bale distributing member is cantilevered outwardly, said bale distributing member including a main actuating arm and a secondary actuating arm operatively connected between said bale distributing member and said piston and cylinder assembly, said last means including linkage extending between said main actuating arm and said framework, a telescopic bar connected by one end to said linkage, a two position stop member secured to said secondary actuating arm, said linkage moving the other end of said telescopic arm into and out of engagement with either one of said positions on said stop member when said bale distributing member is cantilevered outwardly and is delivering bales to a furthermore two tracks of said plurality of tracks thereby transferring some of the weight of the associated bale by compression to said main actuating lever adjacent the base thereof, said linkage moving the other end of said telescopic arm out of engagement with said stop member when said bale distributing member is delivering bales to any of the other of said plurality of tracks, and means on said stop to prevent engagement of said other end of said telescopic arm with one of the positions of said stop member when said bale distributing member is delivering bales to one or more of said tracks, said last means including a detent on said stop member and an offset end on said telescopic arm engaging said detent.

11. The device according to claim 4 which includes means for transferring some of the weight of the bale in said bale distributing member to said framework when said bale distributing member is cantilevered outwardly, said bale distributing member including a main actuating arm and a secondary actuating arm operatively connected between said bale distributing member and said piston and cylinder assembly, said last means including linkage extending between said main actuating arm and said framework, a telescopic bar connected by one end to said linkage, a two position stop member secured to said secondary actuating arm, said linkage moving the other end of said telescopic arm into and out of engagement with either one of said positions on said stop member when said bale distributing member is cantilevered outwardly and is delivering bales to a furthermost two tracks of said plurality of tracks thereby transferring some of the weight of the associated bale by compression to said main actuating lever adjacent the base thereof, said linkage moving the other end of said telescopic arm out of engagement with said stop member when said bale distributing member is delivering bales to any of the other of said plurality of tracks, and means on said stop to prevent engagement of said other end of said telescopic arm with one of the positions of said stop member when said bale distributing member is delivering bales to one or more of said tracks, said last means including a detent on said stop member and an offset end on said telescopic arm engaging said detent.

12. The device according to claim 7 which includes means for transferring some of the weight of the bale in said bale distributing member to said framework when said bale distributing member is cantilevered outwardly, said bale distributing member including a main actuating arm and a secondary actuating arm operatively connected between said bale distributing member and said piston and cylinder assembly, said last means including linkage extending between said main actuating arm and said framework, a telescopic bar connected by one end to said linkage, a two position stop member secured to said secondary actuating arm, said linkage moving the other end of said telescopic arm into and out of engagement with either one of said positions on said stop member when said bale distributing member is cantilevered outwardly and is delivering bales to a furthermost two tracks of said plurality of tracks thereby transferring some of the weight of the associated bale by compression to said main actuating lever adjacent the base thereof, said linkage moving the other end of said telescopic arm out of engagement with said stop member when said bale distributing member is delivering bales to any of the other of said plurality of tracks, and means on said stop to prevent engagement of said other end of said telescopic arm with one of the positions of said stop member when said bale distributing member is delivering bales to one or more of said tracks, said last means including a detent on said stop member and an offset end on said telescopic arm engaging said detent.

13. The device according to claim 2 in which said bale separator includes a right angled bale corner engaging portion engaging the corner of said bale and moving said bale downwardly and separating same from the next succeeding bale.

14. A control mechanism for automatic bale stookers in which said bale stookers include supporting framework, a bale receiving station, a movable bale distributing member normally located adjacent said bale receiving station, means for directing the bale distributing member, upon the receipt of a bale downwardly to a predetermined bale depositing position, said last means including a plurality of diverging tracks, a piston and cylinder assembly in said framework for moving said bale distributing member up and down any one of the plurality of tracks, and means actuated by said bale; said control mechanism including an actuating rod movable from an upper position to a lower position, the upper end of said actuating rod being operatively connected to said means actuated by said bale, a bell crank pivotally connected by one end thereof to the lower end of said actuating rod, said control mechanism including a shuttle valve operatively connected to said piston and cylinder assembly, a rock component journalled for rocking action in said framework, over center linkage extending between one side of said rock component and said shuttle valve, means on the other end of said bell crank engaging with one end of said rock component when said actuating rod is in the upper position, and means operated by said piston and cylinder assembly engageable with said other end of said bell crank to move said actuating rod to the lower position and setting said trigger assembly.

15. The device according to claim 14 in which said last mentioned means includes parallel linkage operatively connected to said piston and cylinder assembly, said linkage including a secondary lever pivoted by one end thereof to said supporting framework, said secondary lever engaging said other end of said bell crank when said piston and cylinder assembly retracts, the movement of said other end of said bell crank rotating said rock component, operating said shuttle valve and thus reversing the action of said piston and cylinder assembly thereby returning said bale distributing member to adjacent said bale receiving station.

* * * * *